United States Patent [19]
Narikawa et al.

[11] Patent Number: 5,838,824
[45] Date of Patent: Nov. 17, 1998

[54] ENCODING/DECODING APPARATUS PROVIDING WITH INPUT/OUTPUT INTERFACE FOR EXTERNAL EQUIPMENT

[75] Inventors: Masaya Narikawa, Osaka; Haruko Ishigami, Moriguchi; Yutaka Nishikawa, Kobe; Mitsunori Ueda, Ibaraki, all of Japan

[73] Assignee: Matsushita Electric Industrial Co., Ltd., Osaka, Japan

[21] Appl. No.: 727,242

[22] Filed: Oct. 8, 1996

Related U.S. Application Data

[63] Continuation-in-part of Ser. No. 687,688, Jul. 26, 1996, abandoned.

[30] Foreign Application Priority Data

Jul. 26, 1995 [JP] Japan .................................. 7-190171

[51] Int. Cl.$^6$ .................................................. G60K 9/00
[52] U.S. Cl. ............................................ 382/232; 382/309
[58] Field of Search .................................... 382/100, 232, 382/302, 303, 304, 305, 306, 307, 309, 310, 311, 312, 233, 234, 235; 345/344, 118, 131, 508; 348/578, 581, 153, 12, 13, 588, 441; 455/2, 4.1

[56] References Cited

U.S. PATENT DOCUMENTS

| | | | |
|---|---|---|---|
| 5,034,807 | 7/1991 | Von Kohorn | 358/84 |
| 5,119,080 | 6/1992 | Kajimoto et al. | 340/723 |
| 5,146,592 | 9/1992 | Pfeiffer et al. | 395/157 |
| 5,229,850 | 7/1993 | Toyoshima | 358/108 |
| 5,287,189 | 2/1994 | Ersoz et al. | 348/588 |

FOREIGN PATENT DOCUMENTS

| | | | |
|---|---|---|---|
| 63-142963 | 6/1988 | Japan | H04N 1/21 |
| 4-117756 | 4/1992 | Japan | H04N 1/00 |
| 4-195088 | 7/1992 | Japan | G09G 3/36 |
| 5-109251 | 4/1993 | Japan | G11B 31/00 |

*Primary Examiner*—Leo H. Boudreau
*Assistant Examiner*—Bijan Tadayon
*Attorney, Agent, or Firm*—Ratner & Prestia

[57] ABSTRACT

A signal switcher and an input/output interface for an external equipment are provided within an encoding/decoding apparatus. A display part in the encoding/decoding apparatus can be utilized by controlling a signal switcher to select either a signal from a writing/reading part or an external signal from the input/output interface for an external equipment by a control microcomputer and supplying the output of the signal switcher to a display part through a decoding processing part.

19 Claims, 5 Drawing Sheets

ENCODING/DECODING APPARATUS PROVIDING WITH INPUT/OUTPUT INTERFACE FOR EXTERNAL EQUIPMENT

This application is a continuation-in-part of U.S. patent application 08/687,688 filed on Jul. 26, 1996, now abandoned.

BACKGROUND OF THE INVENTION

1. Field of the Invention

The present invention relates to a television receiver, a game machine and the like with a built-in data encoding/decoding apparatus for a recording medium such as a CD (Compact Disk), an HD (Hard Disk), DVD (Digital Video Disk), LD (Laser Disk) and the like.

2. Description of the Prior Art

In recent years, equipment or apparatus with a built-in data encoding/decoding apparatus is widely on the market.

In such equipment or apparatus, the built-in data encoding/decoding apparatus can generally be used only in the equipment or apparatus. An example of television receivers with a built-in CD-ROM driver as an encoding/decoding part is explained below referring to FIG. 1.

In FIG. 1, the block 1A is an encoding/decoding part and is composed of a CD-ROM (Read Only Memory) driver for reading a data. The block 2 is a decoding processing part for processing a data read at CD-ROM driver 1A. The block 3 is a display part for displaying a data processed at decoding processing part 2. The block 4 is a control microcomputer. In decoding processing part 2, the block 201 is a decoding processor for decoding a data read at CD-ROM driver 1A and is usually made of an LSI (Large Scale Integrated circuit). The block 202 is a D-RAM (dynamic random access memory) for temporarily storing a data. The block 203 is a video encoder for encoding a video signal decoded at decoding processor 201 into, for example, an NTSC (National Television System Committee) signal. The block 204 is an audio D/A (digital to analog) converter for converting an audio data decoded at decoding processor 201 into an analog signal. The block 205 is an audio output part such as a speaker for outputting an analog audio signal.

The decoding function of the above configuration is explained below. Referring to FIG. 1, when control microcomputer 4 sends a decoding command to CD-ROM driver 1A and decoding processor 201, the CD-ROM driver 1A sends a data read from a CD (compact disk) to decoding processor 201. Decoding processor 201 temporarily stores the received data in DRAM 202 and decodes and processes after dividing it into a video signal and an audio signal. Video encoder 203 encodes the decoded video signal into an NTSC signal and displays the encoded signal at display part 3. Audio D/A converter 204 converts the digital audio signal outputted from decoding processor 201 into an analog audio signal and output sound from a speaker at audio output part 205.

In such a usual television receiver with a CD-ROM driver as a writing/reading apparatus, the signal read from the built-in CD-ROM 1A can not be outputted to an external equipment. Therefore, the same picture as the picture on the television receiver can not be watched on the other monitor.

In the case in which a signal format outputted from the external equipment is different from the signal format for the display part, the video signal decoded at the external equipment can not be displayed on the display part. Accordingly, it is impossible that a picture on a portable equipment such as a knee top personal computer can be enjoyed as a large screen picture.

The present invention solves the above problems and aims to present an encoding/decoding apparatus in which a writing/reading part, a decoding processor and a display part can be easily used from an external equipment.

SUMMARY OF THE INVENTION

To achieve the above object, an encoding/decoding apparatus in accordance with first to third inventions include a writing/reading part for writing and reading a data, a decoding processing part for decoding and processing the data read;

a display part for displaying the data processed at the decoding processing part;

an input/output interface part for an external equipment (I/F part, hereafter) for transferring the data from the writing/reading part to the external equipment or transferring the data from the external equipment to the writing/reading part and for generating a connection signal when the external equipment is connected;

a signal switcher for switching the data from the writing/reading part so as to transfer to either the decoding processing part or the I/F part and for switching the data from the external equipment so as to transfer to either the writing/reading part or the decoding processing part; and a control microcomputer for controlling the writing/reading part, the decoding processing part, the signal switcher and the I/F part.

In the case in which the external equipment uses the writing/reading part, the signal switcher is controlled by the control microcomputer so that the writing/reading part and the I/F part are connected each other. When the external equipment sends a decoding command to the writing/reading part, the writing/reading part reads a data and the data is transmitted to the external equipment through the signal switcher and the I/F part.

In the case in which a data from the external equipment is written in the built-in writing/reading part, the signal switcher is controlled by the control microcomputer so that the writing/reading part and the I/F part are connected each other.

Thus, the writing/reading part built in an encoding/decoding apparatus can be used as a writing/reading part for an external equipment and the data from the external equipment can be displayed on the display part of the encoding/decoding apparatus.

An encoding/decoding apparatus in accordance with a fourth invention includes a writing/reading part for writing and reading a data, a decoding processing part for decoding and processing the data read;

a display part for displaying the data processed at the decoding processing part;

an I/F part for converting the data from the external equipment and for generating a connection signal when the external equipment is connected;

a signal switcher for switching which the data to the display part is taken from either the decoding processing part or the I/F part; and a control microcomputer for controlling the writing/reading part, the decoding processing part, the I/F part and the signal switcher.

In the case in which the external equipment uses the display part in the encoding/decoding apparatus, the signal switcher is switched by the control microcomputer so that the I/F part is connected to the display part. When the external equipment inputs a data signal to the decoding apparatus, the control microcomputer controls the I/F part to convert the data signal from the external equipment into a signal format suitable for the display part. The display part displays the converted signal. Thus, the output signal can be displayed on the display part in the encoding/decoding apparatus.

An encoding/decoding apparatus in accordance with a fifth invention includes a writing/reading part for writing and reading a data, a decoding processing part for decoding and processing the data read;

an I/F part for transferring the data from the writing/reading part to an external equipment or for transferring a data from the external equipment to the writing/reading part and generating a connection signal when the external equipment is connected;

a display part for displaying the data processed at the decoding processing part or a signal inputted from an external equipment through the I/F part;

a first signal switcher for switching the data from the writing/reading part so as to transfer to either the decoding processing part or the I/F part and for connecting the I/F part and the decoding processing part so that a data from the external equipment is transferred to the decoding processing part;

a second signal switcher for switching which the input signal to the display part is taken, from either the decoding processing part or the I/F part; and a control microcomputer for controlling the writing/reading part, the decoding processing part, the first signal switcher, the second signal switcher and the I/F part.

In the case in which the external equipment uses the writing/reading part in the encoding/decoding apparatus, the first signal switcher is controlled by the control microcomputer so that the writing/reading part and the I/F part are connected each other. When the external equipment sends a decoding command to the writing/reading part, the writing/reading part reads a data and the data is transferred to the external equipment through the first signal switcher and the I/F part.

Also in the case in which a data from the external equipment is written in the writing/reading part, the first signal switcher is controlled by the control microcomputer so that the writing/reading part and the I/F part are connected each other.

Thus, the writing/reading part built in the encoding/decoding apparatus can be used as a writing/reading part for the external equipment.

In the case in which the output from the external equipment is displayed on the display part in the encoding/decoding apparatus, which signal outputted from the external equipment is, a data signal or a video signal is judged at the control microcomputer. When it is a data signal, the first signal switcher is switched by the control microcomputer so as to connect the I/F part to the decoding processing part and the second signal switcher is switched also by the control microcomputer so as to connect the decoding processing part to the display part.

When it is a video signal, the second signal switcher is switched also by the control microcomputer so as to connect the I/F part to the display part and the signal from the external equipment is converted into a signal format suitable for the display part and is transferred to the display part through the second signal switcher.

Thus, the signal from the external equipment can be displayed on the display part in the encoding/decoding apparatus.

DETAILED DESCRIPTION OF THE INVENTION (First Exemplary Embodiment)

Figure 2:
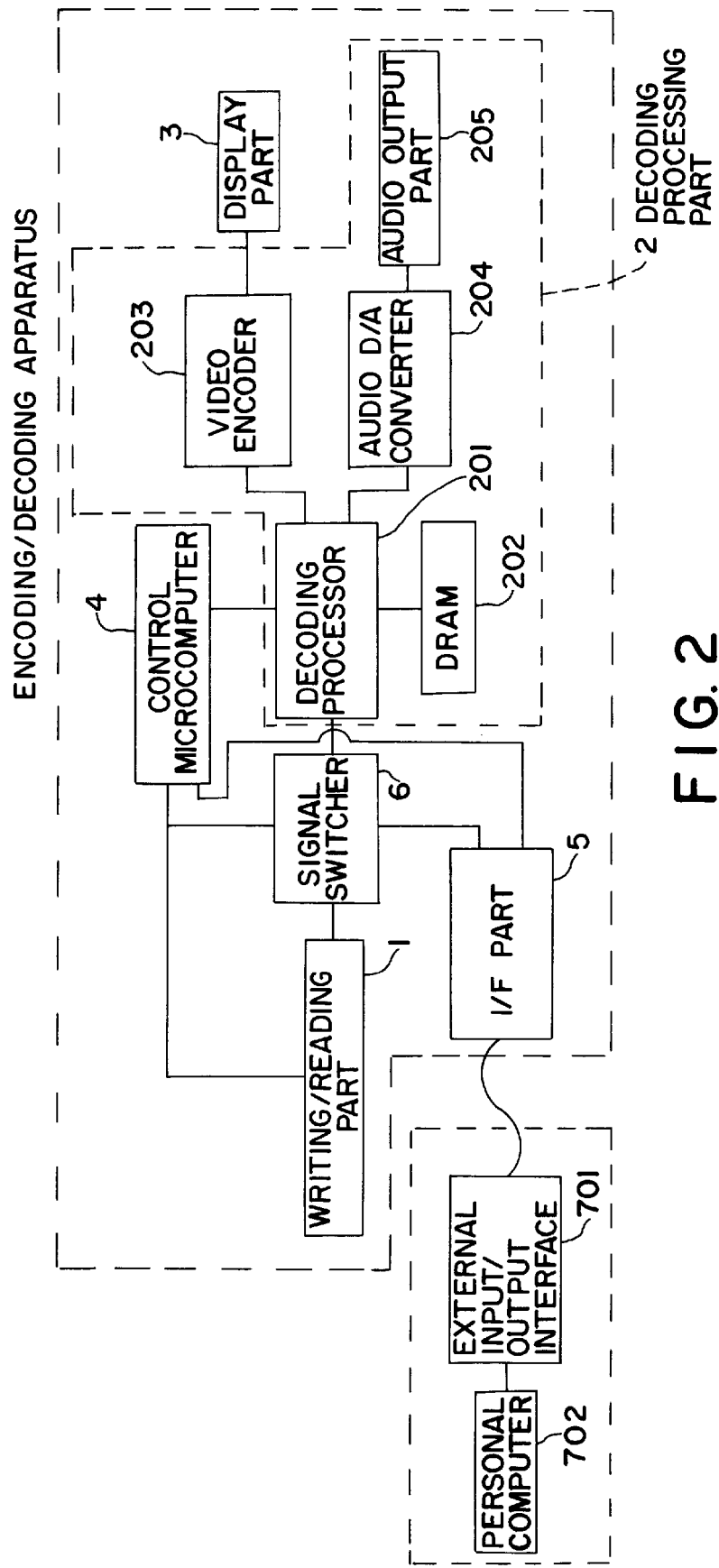
FIG. 2 is a block diagram of an encoding/decoding apparatus providing with an input/output interface for an external equipment in accordance with a first exemplary embodiment of the present invention.

A block diagram of an encoding/decoding apparatus providing with an input/output interface for an external equipment in accordance with a first exemplary embodiment of the present invention is shown in FIG. 2.

Figure 1:
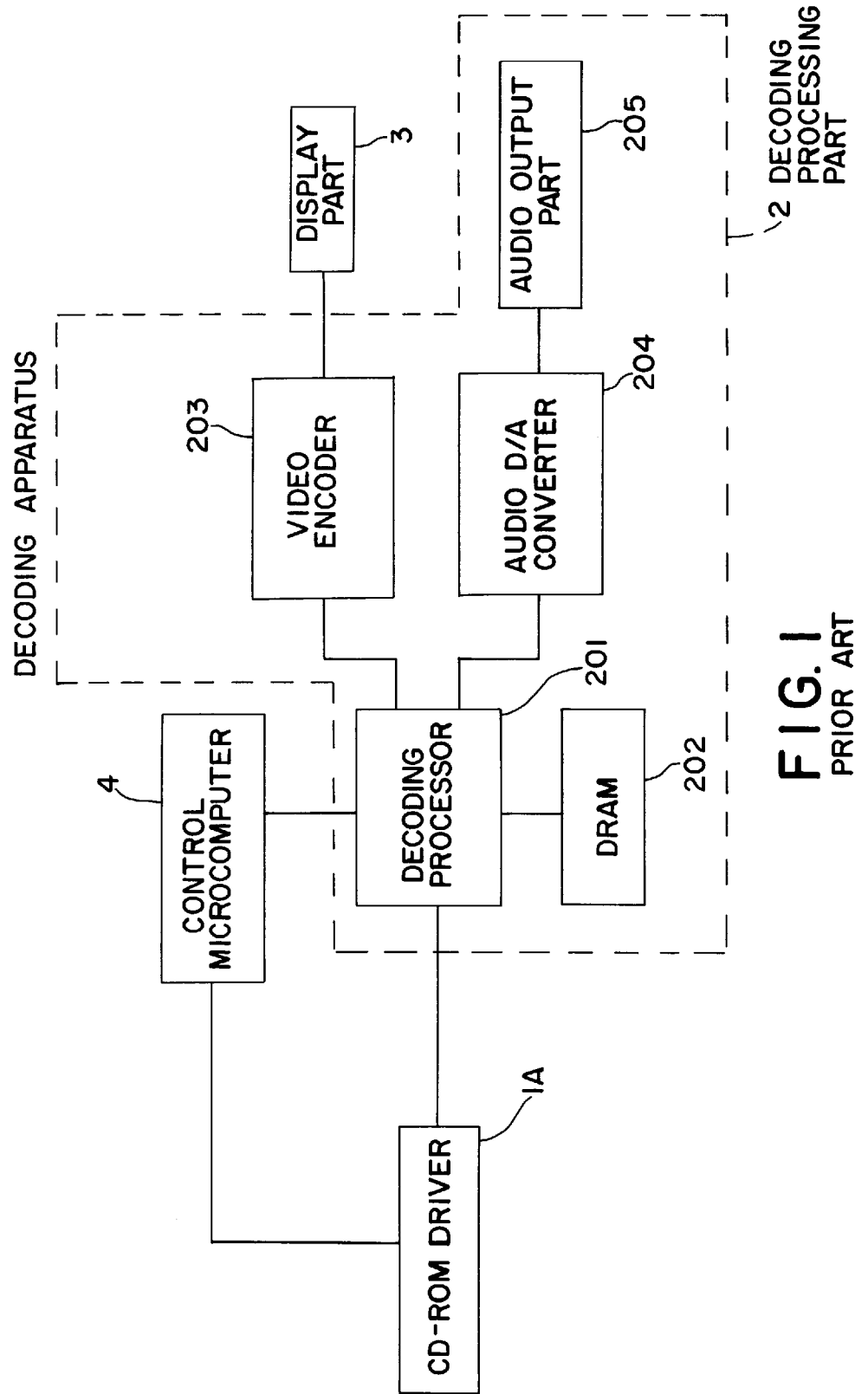
FIG. 1 is a block diagram of a CD-ROM driver in accordance with the prior art.

Referring to FIG. 2, the block 1 is a writing/reading part such as a CD-RAM driver having a recordable medium. A decoding processing part 2, a display part 3 have similar functions to those having the same reference numbers in FIG. 1. The block 7 is an external equipment. The block 5 is an interface for an external equipment (I/F part, hereafter) including a connection detector and a host adapter with SCSI (Small Computer System Interface) standard for control transferring a data among external equipment 7, writing/reading part 1 and a control microcomputer 4 and generating a signal to inform a connection when external equipment 7 is connected. The block 6 is a signal switcher for switching a data read at writing/reading part 1 to supply to either decoding processing part 2 or I/F part 5 by being controlled by control microcomputer 4. The block 702 in external equipment 7 is a personal computer and the block 701 is an input/output interface for transferring a data from the personal computer 702. The block 4 is a control microcomputer and controls writing/reading part 1, decoding processing part 2, I/F part 5 and signal switcher 6.

(1) The case in which a data read at writing/reading part 1 is displayed on display part 3.

In FIG. 2, control microcomputer 4 controls signal switcher 6 to connect writing/reading part 1 to decoding processing part 2 and sends a decoding command to writing/reading part 1 and decoding processing part 2. The decoding processing part 2 receives a data read at the writing/reading part 1 through the signal switcher 6 and processes similarly to the prior art. Display part 3 displays the processed data.

(2) The case in which a data from external equipment 7 is written in writing/reading part 1.

When control microcomputer 4 perceives that external equipment 7 is connected and receives a control signal to use writing/reading part 1 from external equipment 7, control microcomputer 4 sends a control signal for determining a transmission direction of the signal to signal switcher 6. (In this case, I/F part 5 and writing/reading part 1 are connected each other.) Thus, a route from external equipment 7 to writing/reading part 1 through I/F part 5 and signal switcher 6 in order is made. External equipment 7 sends a command signal to start writing to control microcomputer 4, control microcomputer 4 sends a control signal to write in writing/reading part 1 and external equipment 7 sends a data signal (for example, a digitalized text data signal) to writing/reading part 1 passing on the route mentioned above. Thus, the data sent from external equipment 7 can be written in writing/reading part 1.

(3) The case in which external equipment 7 reads a data in writing/reading part 1.

In FIG. 2, when I/F part 5 detects that external equipment 7 is connected to the encoding/decoding apparatus, a control signal indicating that external equipment 7 is connected is sent from I/F part 5 to control microcomputer 4. When control microcomputer 4 perceives that external equipment 7 is connected and receives a control signal to use writing/reading part 1 from external equipment 7, control microcomputer 4 sends a control signal for determining a transmission direction of the signal to signal switcher 6. (In this case, I/F part 5 and writing/reading part 1 are connected each other.) Thus, a route from writing/reading part 1 to external equipment 7 through signal switcher 6 and I/F part 5 in order is made. External equipment 7 sends a command signal, to start writing to control microcomputer 4 and control microcomputer 4 sends a control signal to read in writing/reading part 1. Thus, the data sent from writing/reading part 1 to external equipment 7 can be read at external equipment 7.

A detection of connection of an external equipment is possible by using a switch such as a switch with S terminal for connecting a video cassette recorder or by detecting a voltage or a current on a specified signal line or by detecting a voltage or a current on AC supply line when the AC power of the external equipment is supplied from the AC outlet provided on the encoding/decoding apparatus.

In the case in which a television receiver or a monitor is connected as an external equipment 7, the same picture from writing/reading part 1 as that displayed on display part 3 can simultaneously be watched on the television receiver or the monitor.

In the first exemplary embodiment, a drive unit using a recording medium which is able to write and read such as CD-RAM, MO (Magneto-Optical) disk, HD (Hard Disk), FD (Floppy Disk), PD (Phase change optical disk), DVD-RAM (Digital Video Disk Random Access Memory), MD (Mini Disk) and the like can be used as a writing/reading part 1. If the apparatus is used only for decoding, a CD drive unit, LD drive unit and the like can be used.

As a signal switcher 6, a switch using a relay device or a semiconductor device such as transistors can be used.

(Second Exemplary Embodiment)

Figure 3:
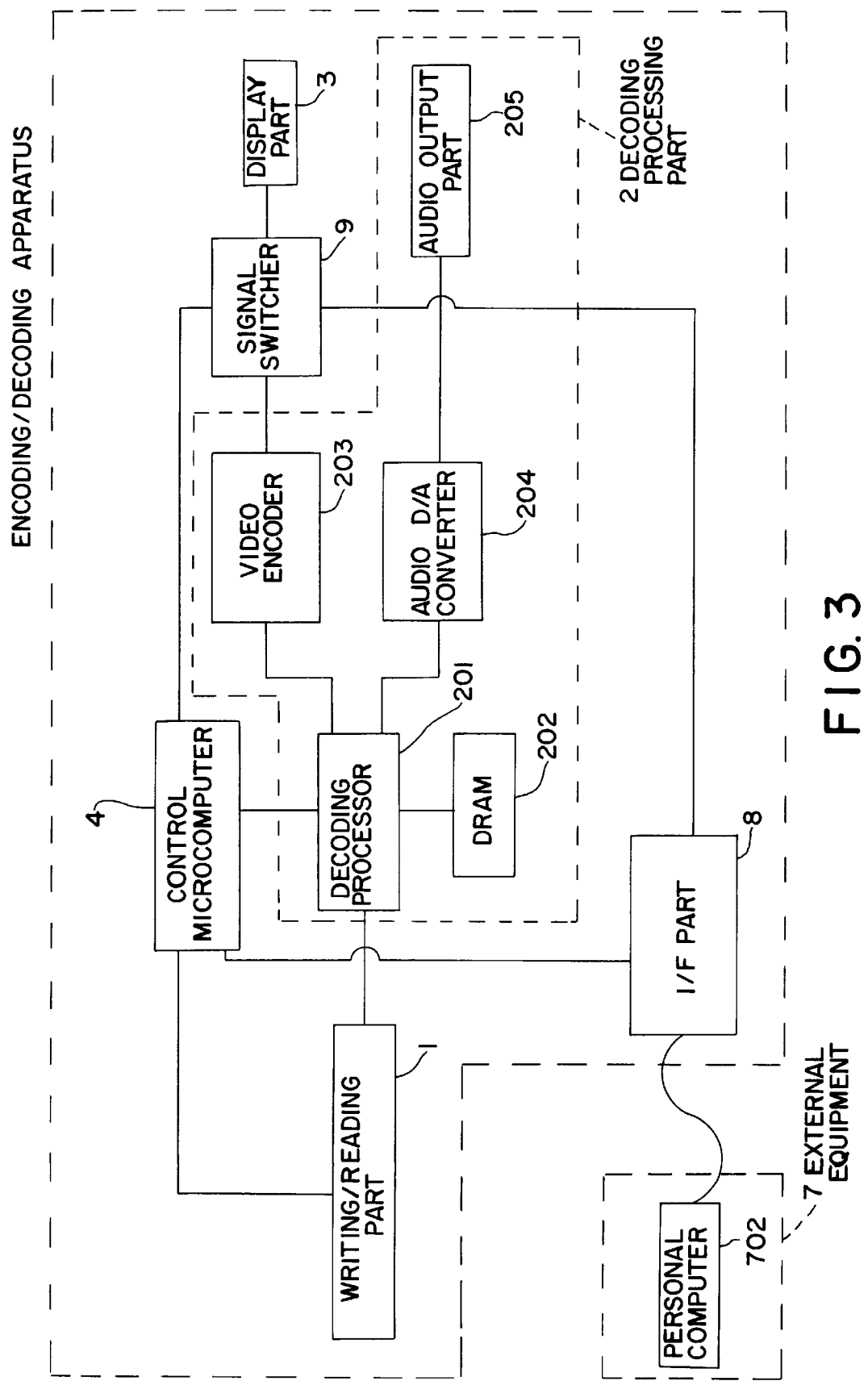
FIG. 3 is a block diagram of an encoding/decoding apparatus providing with an input/output interface for an external equipment in accordance with a second exemplary embodiment of the present invention.

A block diagram of an encoding/decoding apparatus providing with an input/output interface for an external equipment in accordance with a second exemplary embodiment of the present invention is shown in FIG. 3. In FIG. 3, a writing/reading part 1, a decoding processing part 2 and a display part 3 function similarly to those of the first exemplary embodiment. The block 7 is an external equipment similar to that of the first exemplary embodiment. The block 8 is an I/F part including a connection detector and a scan converter for converting a video signal outputted from external equipment 7 into a video signal format which can be displayed on display part 3 and generating a signal informing the connection when external equipment 7 is connected. The block 9 is a signal switcher for selecting an input signal to display part 3 from either decoding processing part 2 or I/F part 8 by a command signal from a control microcomputer 4. The block 4 is a control microcomputer and controls writing/reading part 1, decoding processing part 2, signal switcher 9 and I/F part 8.

(1) The case in which a data read at writing/reading part 1 is displayed on display part 3.

Control microcomputer 4 controls signal switcher 9 so as to connect decoding processing part 2 to display part 3 and sends a control signal (for example, a digital control signal) to read to writing/reading part 1 and decoding processing part 2. The decoding processing part 2 receives a data (for example, a digital data signal) read at writing/reading part 1 and processes the received data like the prior art. Display part 3 displays the processed data (for example, R, G, B analog video signal).

(2) The case in which a video signal from external equipment 7 is displayed on display part 3.

When I/F part 8 detects that external equipment 7 is connected, I/F part 8 sends a control signal informing the connection to control microcomputer 4. When control microcomputer 4 perceives that external equipment 7 is connected and receives a control signal to use display part 3 from external equipment 7, control microcomputer 4 sends a control signal for determining a transmission direction of the signal to signal switcher 9. (In this case, I/F part 8 is connected to display part 3.) Thus, a route from external equipment 7 to display part 3 through I/F part 8 and signal switcher 9 in order is made. When a video signal is supplied from external equipment 7, I/F part 8 converts it to a video signal format suitable to display part 3 (for example, down converts a signal with VGA (Video Graphic Array) format of personal computer into a signal with NTSC standard) and transfers the converted video signal to display part 3. Thus, it becomes possible to display the signal from external equipment 7 on display part 3, in addition to a usual decoding function by a CD-ROM driver.

In the second exemplary embodiment, although a drive unit using a recording medium which is able to write and read can be used as a writing/reading part 1. it is favorable to use a drive unit for only decoding such as a CD drive unit.

As a signal switcher 9, a switch using a relay device or a semiconductor device such as transistor can be used.

(Third Exemplary Embodiment)

Figure 4:
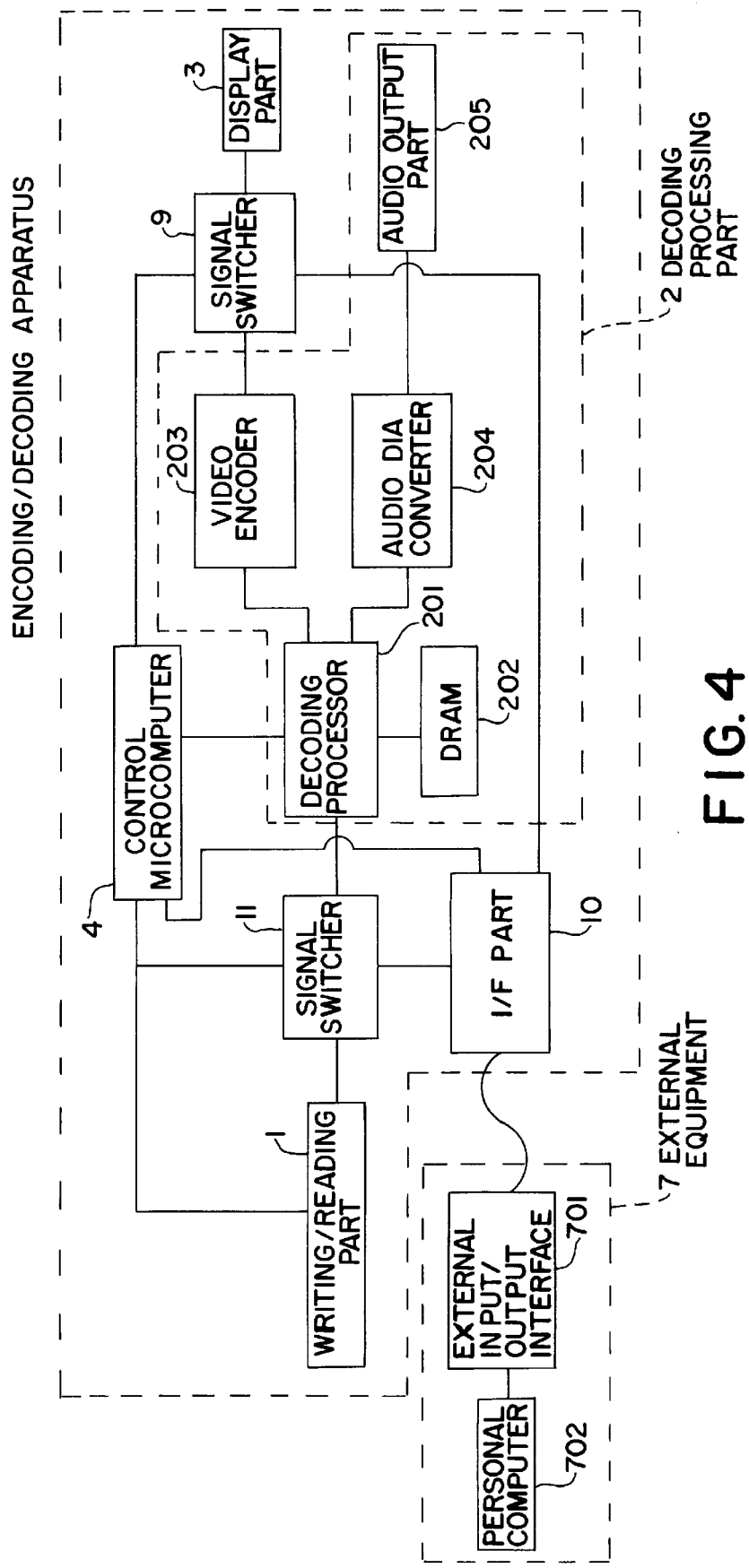
FIG. 4 is a block diagram of an encoding/decoding apparatus providing with an input/output interface for an external equipment in accordance with a third exemplary embodiment of the present invention.

A block diagram of an encoding/decoding apparatus providing with an input/output interface for an external equipment in accordance with a third exemplary embodiment of the present invention is shown in FIG. 4.

In FIG. 4, a writing/reading part 1, a decoding processing part 2 and a display part 3 function similarly to those of the first exemplary embodiment. The block 7 is an external equipment. The block 10 is an I/F part including (a) a host adapter 101 with SCSI standard to control transmission for giving or taking a data to or from external equipment 7 and functioning similar to I/F part 8 in the second exemplary embodiment when the inputted signal is a video signal and generating a signal to inform a connection when external equipment 7 is connected, (b) a scan converter 103 converting a video signal outputted from external equipment 7 into a video signal format which can be displayed on display part 3, (c) a signal switcher 102 which switches so as to connect external equipment 7 to signal switcher 11 through SCSI host adapter 101 after converting into a video signal format suitable for display part 3 when the signal supplied from external equipment 7 is a data signal like as mentioned in the first exemplary embodiment and switches so as to connect external equipment 7 to signal switcher 9 through scan converter 103 after converting into a video signal format suitable for display part 3 when the signal supplied from external equipment 7 is a video signal like as mentioned in the second exemplary embodiment and (d) a connection detector detecting the connection of external equipment 7 and informing it to control microcomputer 4.

Figure 5:
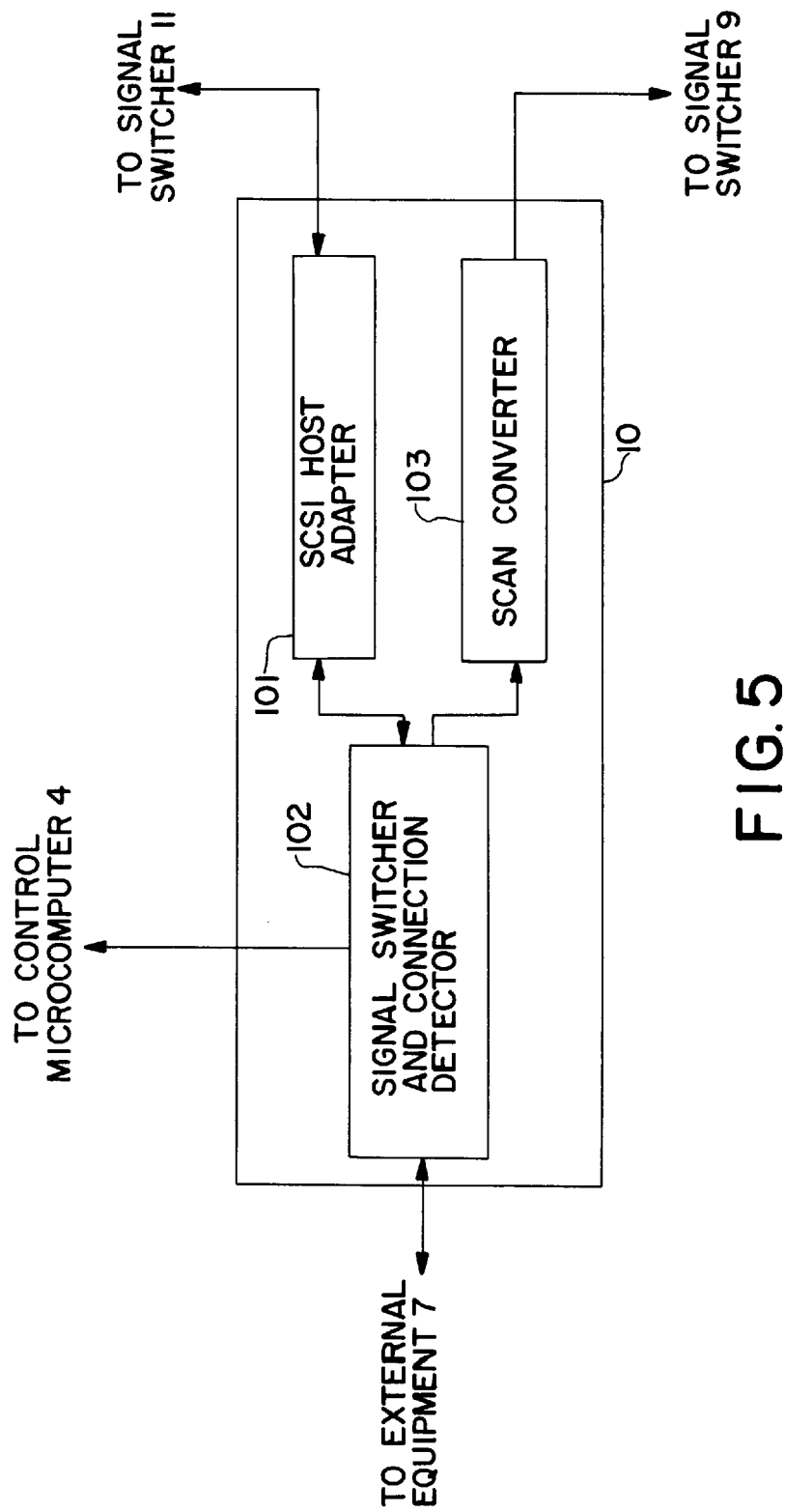
FIG. 5 is a block diagram of an I/F part 10 of an encoding/decoding apparatus in accordance with a third exemplary embodiment of the present invention.

A block diagram of I/F part 10 is shown in FIG. 5.

(1) The case in which a data read at writing/reading part 1 is displayed on display part 3.

Control microcomputer 4 controls signal switcher 11 so as to connect writing/reading part 1 to decoding processing part 2 and controls signal switcher 9 so as to connect decoding processing part 2 to display part 3 and sends a decoding command to writing/reading part 1 and decoding processing part 2. The decoding processing part 2 receives a data read at the writing/reading part 1 and processes the data like the prior art. Display part 3 displays the processed data.

(2-1) The case in which a video signal from external equipment 7 is displayed on display part 3.

When control microcomputer 4 receives a control signal to inform that external equipment 7 is connected and further receives a control signal from external equipment 7 for displaying on display part 3, control microcomputer 4 controls signal switcher 9 so as to connect I/F part 10 to display part 3 and controls a signal switcher 102 in I/F part 10 so as to connect external equipment 7 to signal switcher 9 through scan converter 103. (In this case, the video signal inputted from external equipment 7 is converted into a video signal format which can be displayed on display part 3 at I/F part 10.) Thus, a signal route from external equipment 7 to display part 3 through I/F part 10 and signal switcher 9 is made and the video signal from external equipment 7 can be displayed on display part 3.

(2-2) The case in which a data signal from external equipment 7 is displayed on display part 3.

When control microcomputer 4 receives a control signal to inform that external equipment 7 is connected from I/F part 10 and further receives a control signal from external equipment 7 for using decoding processing part 2 and display part 3, control microcomputer 4 controls signal switcher 9 to connect decoding processing part 2 to display part 3, controls signal switcher 102 in I/F part 10 to connect external equipment 7 to signal switcher 11 and further controls signal switcher 11 to connect I/F part 10 to decoding processing part 2. Thus, a signal route from external equipment 7 to display part 3 through I/F part 10, signal switcher 11 and decoding processing part 2 is made and a data signal from external equipment 7 can be displayed on display part 3.

(3) The case in which a data from external equipment 7 is written in writing/reading part 1.

When control microcomputer 4 receives a control signal informing that external equipment 7 is connected from I/F part 10 and receives a control signal from external equipment 7 for using a writing function of writing/reading part 1, control microcomputer 4 controls the signal switcher 102 in I/F part 10 to connect external equipment 7 to signal switcher 11 through SCSI host adapter 101 and controls signal switcher 11 to connect writing/reading part 1 to I/F part 10. Thus, a signal route from external equipment 7 to writing/reading part 1 through I/F part 10 and signal switcher 11 is made and a control signal for writing is sent from external equipment 7 to control microcomputer 4 and a command signal for writing is sent from control microcomputer 4 to writing/reading part 1. Thus, the data in external equipment 7 can be written in writing/reading part 1 of the encoding/decoding apparatus.

(4) The case in which a data in writing/reading part 1 is read at external equipment 7.

When control microcomputer 4 receives a control signal informing that external equipment 7 is connected from I/F part 10 and receives a control signal from external equipment 7 for using a reading function of writing/reading part 1, control microcomputer 4 controls the signal switcher 102 in I/F part 10 to connect external equipment 7 to signal switcher 11 through SCSI host adapter 101 and controls signal switcher 11 to connect writing/reading part 1 to I/F part 10. Thus, a signal route from external equipment 7 to writing/reading part 1 through I/F part 10 and signal switcher 11 is made and a control signal for reading is sent from external equipment 7 to control microcomputer 4 and a command signal for reading is sent from control microcomputer 4 to writing/reading part 1. Thus, the data in writing/reading part 1 of the encoding/decoding apparatus can be read at external equipment 7.

In the third exemplary embodiment, a drive unit using a recording medium which is able to write and read such as CD-RAM, MO disk, HD, FD, PD, DVD-RAM, MD and the like can be used as a writing/reading part 1. If the apparatus is used only for decoding, a CD drive unit, LD drive unit and the like can be used.

As signal switchers 9 and 11, a switch using a relay device or a semiconductor device such as transistor can be used.

As obvious from the above explanation, because the use of an encoding/decoding apparatus built in an electronic appliance as a single unit makes the writing/reading part in the encoding/decoding apparatus possible to use in common for the external equipment, if a video equipment such as a television receiver or a monitor is connected as an external equipment, the same information (picture or data) as that displayed on the main equipment (a television receiver) can be watched on the screen of the connected external equipment and if a personal computer is connected as an external equipment, the same information as that displayed on the display part of the encoding/decoding apparatus can be watched in the display monitor for the personal computer. It gives a great effect in saving space and cost reduction of the total system.

Because the I/F part controlled by the external equipment in the prior art is controlled by a control microcomputer of the encoding/decoding apparatus, a load for the external equipment can be reduced and the external equipment can be effectively utilized.

The invention may be embodied in other specific form without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed:

1. An encoding/decoding apparatus for use with a recording medium in which data is stored, comprising:

writing/reading means for reading a data signal from said recording medium;

decoding processing means for converting the data signal read from said writing/reading means into a video signal;

display means for displaying the video signal from said decoding processing means;

input/output interface means for external equipment for transferring the data signal read from said writing/reading means to external equipment;

signal switching means for supplying the data signal of said writing/reading means to one of said decoding processing means and said input/output interface means for external equipment; and control means for controlling said writing/reading means, said decoding processing means, said signal switching means and said input/output interface means for external equipment.

2. An encoding/decoding apparatus for use with a recording medium in which data can be stored, comprising:

input/output interface means for external equipment for converting a data signal from external equipment into a video signal;

writing/reading means for storing the first video signal in said recording medium;

decoding processing means for converting the first video signal from said input/output interface means for external equipment into a second video signal;

display means for displaying the second video signal from said decoding processing means;

signal switching means for supplying the first video signal of said input/output interface means for external equipment to one of said writing/reading means and said decoding processing means; and control means for controlling said writing/reading means, said decoding processing means, said signal switching means and said input/output interface means for external equipment.

3. An encoding/decoding apparatus for use with a recording medium in which data is stored, comprising:

writing/reading means for reading a data signal from said recording medium;

decoding processing means for converting one of the data signal read from said writing/reading means and a first video signal into a second video signal;

display means for displaying the second video signal from said decoding processing means;

input/output interface means for external equipment for converting the data signal from external equipment into the first video signal;

signal switching means for supplying one of the data signal from said writing/reading means and said first video signal from said input/output interface means for external equipment to said decoding processing means; and control means for controlling said writing/reading means, said decoding processing means, said signal switching means and said input/output interface means for external equipment.

4. An encoding/decoding apparatus for use with a recording medium in which data is stored, comprising:

writing/reading means for reading a data signal from said recording medium;

decoding processing means for converting the data signal read from said writing/reading means into a first video signal;

input/output interface means for external equipment for converting the data signal from external equipment into a second video signal;

signal switching means for supplying one of the first video signal from said writing/reading means and the second video signal from said input/output interface means for external equipment to display means;

said display means for displaying the video signal provided from said signal switching means; and control means for controlling said writing/reading means, said decoding processing means, said signal switching means and said input/output interface means for external equipment.

5. An encoding/decoding apparatus for use with a recording medium in which data is stored or can be stored, comprising:

writing/reading means for reading a first data signal from said recording medium or storing a second data signal in said recording medium;

decoding processing means for converting the first data signal read from said writing/reading means into a first video signal;

input/output interface means for external equipment for one of transferring the first data signal read from said writing/reading means to external equipment and converting a third data signal from the external equipment into a second video signal;

first signal switching means for connecting said writing/reading means and one of said decoding processing means and said input/output interface means for external equipment and for connecting said input/output interface means for external equipment and one of said writing/reading means and said decoding processing means;

second signal switching means for supplying the first video signal from said decoding processing means and the second video signal from said input/output interface means for external equipment to display means;

display means for displaying the video signal provided from said second signal switching means; and control means for controlling said writing/reading means, said decoding processing means, said first signal switching means, said second signal switching means and said input/output interface means for external equipment.

6. An encoding/decoding apparatus for use with external equipment and a recording medium in which data is stored, comprising:

writing/reading means for reading data from said recording medium or writing data to said recording medium;

input/output interface means for transferring data to and from said external equipment;

decoding processing means for converting data into a video signal to be displayed;

signal switching means for supplying data to one of said decoding processing means, said input/output interface means, and said writing/reading means responsive to a request;

control means for controlling said writing/reading means, said decoding processing means, said signal switching means, and said input/output interface means; and display means for displaying the video signal provided from said decoding processing means.

7. The encoding/decoding apparatus of claim 6, wherein the signal switching means supplies the data read at said writing/reading means to said decoding processing means when data read at said writing/reading means is to be displayed.

8. The encoding/decoding apparatus of claim 6, wherein the signal switching means supplies the data read at said writing/reading means to said input/output interface means when data requested at said external equipment is to be read from said recording medium.

9. The encoding/decoding apparatus of claim 6, wherein the signal switching means supplies the data of said input/output interface means to said writing/reading means when data read from said external equipment is to be stored in said recording medium.

10. An encoding/decoding apparatus for use with external equipment and a recording medium in which data is stored, comprising:

writing/reading means for reading data from said recording medium;

input/output interface means for transferring data to and from said external equipment;

decoding processing means for converting data into a video signal to be displayed;

display means for displaying said video signal;

signal switching means for supplying one of the video signal and data to said display means responsive to a request; and control means for controlling said writing/reading means, said decoding processing means, said signal switching means and said input/output interface means.

11. The encoding/decoding apparatus of claim 10, wherein the signal switching means supplies the video signal of said decoding processing means to said display means when data read at said writing/reading means is to be displayed.

12. The encoding/decoding apparatus of claim 10, wherein the signal switching means supplies the data of said input/output interface means to said display means when data read from said external equipment is to be displayed.

13. An encoding/decoding apparatus for use with external equipment and a recording medium in which data is stored, comprising:

writing/reading means for reading data from said recording medium or storing data to said recording medium;

input/output interface means for transferring data to and from said external equipment and for converting a video signal into a digital video signal;

decoding processing means for converting data into a video signal to be displayed;

display means for displaying at least one of the video signal, the digital video signal, and data;

first signal switching means for supplying data to one of said decoding processing means, said input/output interface means, and said writing/reading means responsive to a request;

second signal switching means for supplying one of the video signal, the digital video signal, and data to said display means responsive to a request; and control means for controlling said writing/reading means, said decoding processing means, said first signal switching means, said second signal switching means, and said input/output interface means.

14. The encoding/decoding apparatus of claim 13, wherein (1) the first signal switching means supplies the data of said writing/reading means to said decoding processing means, and (2) the second signal switching means supplies the video signal of said decoding processing means to said display means when data read at said writing/reading means is to be displayed.

15. The encoding/decoding apparatus of claim 13, wherein (1) the first signal switching means supplies the data of said input/output interface means to said decoding processing means, and (2) the second signal switching means supplies the video signal of said decoding processing means to said display means when data read from said external equipment is data to be displayed.

16. The encoding/decoding apparatus of claim 13, wherein the first signal switching means supplies the output of said input/output interface means to said writing/reading means when said external equipment writes data to said recording medium.

17. The encoding/decoding apparatus of claim 13, wherein the first signal switching means supplies data from said writing/reading means to said input/output interface means when said external equipment requests data from said recording medium.

18. The encoding/decoding apparatus of claim 13, wherein the second signal switching means supplies the digital video signal of said input/output interface means to said display means when data read from said external equipment is a video signal to be displayed.

19. An encoding/decoding apparatus according to claim 6, wherein the writing/reading means comprises a driver for one of a compact disk random access memory (CD-RAM), a magneto-optical disk, a hard disk, a floppy disk, a phase change optical disk, a digital video disk RAM, and a mini disk.

* * * * *